(12) United States Patent
Nakajima (10) Patent No.: US 8,861,036 B2
(45) Date of Patent: Oct. 14, 2014

(54) IMAGE FORMING APPARATUS AND DENSITY CORRECTION METHOD

(71) Applicant: Takehiro Nakajima, Tokyo (JP)

(72) Inventor: Takehiro Nakajima, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 28 days.

(21) Appl. No.: 13/796,020

(22) Filed: Mar. 12, 2013

(65) Prior Publication Data
US 2013/0242349 A1    Sep. 19, 2013

(30) Foreign Application Priority Data

Mar. 14, 2012  (JP) ................ 2012-057726

(51) Int. Cl.
| | | |
|---|---|---|
| *H04N 1/407* | (2006.01) | |
| *H04N 1/60* | (2006.01) | |
| *G06K 15/02* | (2006.01) | |
| *H04N 1/40* | (2006.01) | |
| *H04N 1/00* | (2006.01) | |

(52) U.S. Cl.
CPC ........ *G06K 15/1872* (2013.01); *H04N 1/40006* (2013.01); *H04N 1/00068* (2013.01); *H04N 1/00045* (2013.01); *H04N 1/00034* (2013.01); *H04N 1/00015* (2013.01); *H04N 1/407* (2013.01); *H04N 1/6027* (2013.01); *H04N 1/6033* (2013.01)
USPC ......... 358/3.21; 358/3.26; 358/504; 358/521; 358/406; 358/461

(58) Field of Classification Search
None
See application file for complete search history.

(56) References Cited

U.S. PATENT DOCUMENTS

| | | | | |
|---|---|---|---|---|
| 5,754,683 | A | * | 5/1998 | Hayashi et al. ............... 358/504 |
| 7,542,168 | B2 | * | 6/2009 | Goma et al. .................. 358/504 |
| 8,059,312 | B2 | | 11/2011 | Yamada |

FOREIGN PATENT DOCUMENTS

| | | |
|---|---|---|
| JP | 08-032807 | 2/1996 |
| JP | 3430702 | 7/2003 |
| JP | 4297168 | 7/2009 |

* cited by examiner

*Primary Examiner* — Scott A Rogers
(74) *Attorney, Agent, or Firm* — Harness, Dickey & Pierce, P.L.C.

(57) ABSTRACT

An image forming apparatus having density correction characteristic data and a section to execute density conversion on input image data includes a section to generate detecting patterns with multiple area ratios, a section to create images of the patterns on an image bearing member, a section to detect the images of the patterns created on the image bearing member, a section to hold detected values corresponding to the images of the patterns detected from the image bearing member, a section to obtain fixed values or previously detected values as target values for correction, and correction coefficients, a section to calculate a correction characteristic corresponding to the detecting patterns from the obtained target values, the detected values, and correction coefficients, and a section to synthesize new density correction characteristic data from the density correction characteristic data and the correction characteristic corresponding to the patterns.

7 Claims, 8 Drawing Sheets

IMAGE FORMING APPARATUS AND DENSITY CORRECTION METHOD

BACKGROUND OF THE INVENTION

1. Field of the Invention

The disclosures herein generally relate to an image forming apparatus such as a digital color copy machine or a printer, especially, a technology for correcting density that can reduce a differentiation of printing density caused by change over time.

2. Description of the Related Art

To reduce a differentiation of printing density caused by change over time which appears on a printed image output by an image forming apparatus, there is a known method in which a detecting pattern is formed on an image bearing member, which is captured as a detected value by a sensor, which is then used together with a target value for correction to calculate a corrected value to be reflected in a density conversion process in a later stage. However, in the conventional method, since a target value for correction is set to a fixed value, there is a problem in that a large difference of density may be perceptible by appearances between images before and after the correction process.

For example, Japanese Patent No. 4297168 discloses a technology for correcting density of an image based on a relationship between a measured density of dither data and a target density of the dither data set in advance, to prevent an occurrence of a density measurement error caused by change over time or an occurrence of a density measurement error caused by lot variations. However, the problem of a large difference of density perceptible by appearances between images before and after the correction process cannot be solved because a target value for correction is set to a fixed value.

SUMMARY OF THE INVENTION

It is a general object of at least one embodiment of the present invention to provide an image forming apparatus and a density correction method with which the problem of a large difference of density perceptible by appearances between images before and after the correction process can be solved.

According to at least one embodiment of the present invention, an image forming apparatus including density correction characteristic data for a tone characteristic and a section to execute density conversion on input image data based on the density correction characteristic data includes a section to generate multiple detecting patterns with multiple area ratios, a section to create images of the multiple detecting patterns in a prescribed order on an image bearing member, a section to detect the images of the multiple detecting patterns created on the image bearing member, a section to hold multiple detected values corresponding to the images of the multiple detecting patterns detected from the image bearing member, a section to obtain either of fixed values or previously detected values as target values for correction based on a prescribed condition, and also to obtain correction coefficients to be used for adjustment, a section to calculate a temporary correction characteristic corresponding to the detecting patterns from the obtained target values and the detected values, a section to calculate a correction characteristic corresponding to the detecting patterns from the temporary correction characteristic and the obtained correction coefficient, and a section to synthesize new density correction characteristic data for each of plural of the tone characteristics from the density correction characteristic data for the corresponding tone characteristic and the correction characteristic corresponding to the detecting patterns.

According to at least one embodiment of the present invention, it is possible to prevent excessive correction and to reduce the problem of a large difference of density perceptible between images before and after the correction process.

BRIEF DESCRIPTION OF THE DRAWINGS

Other objects and further features of embodiments will become apparent from the following detailed description when read in conjunction with the accompanying drawings.

DESCRIPTION OF THE PREFERRED EMBODIMENTS

In the following, an embodiment of the present invention will be described with reference to the drawings.

Figure 1:
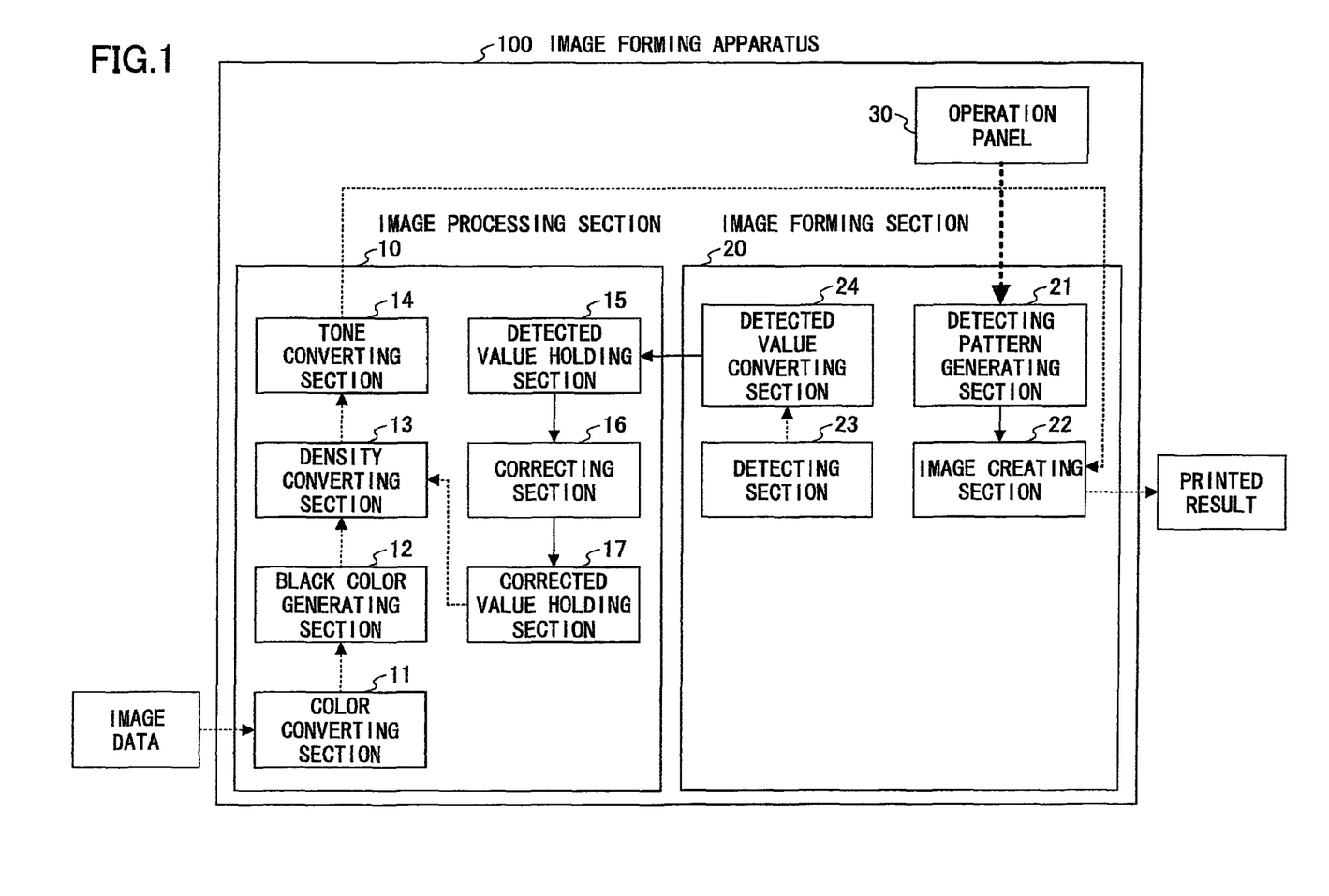
FIG. 1 is a functional block diagram of an image forming apparatus according to an embodiment of the present invention.

FIG. 1 is a functional block diagram of an image forming apparatus according to an embodiment of the present invention. In FIG. 1, an image forming apparatus 100 includes an image processing section 10, an image forming section 20, and an operation panel 30 as a user interface. The image forming apparatus 100 may include an image capturing section (a scanner section), which is not shown in FIG. 1. In addition, the image forming apparatus 100 may be connected with a personal computer or the like, which is not shown in FIG. 1.

The image processing section 10 is configured with a color converting section 11, a black color generating section 12, a density converting section 13, a tone converting section 14, a detected value holding section 15, a correcting section 16, and a corrected value holding section 17.

The image forming section 20 is configured with a detecting pattern generating section 21, an image creating section 22, a detecting section 23, and a detected value converting section 24. The image creating section 22 is a generic term to designate a mechanical section of a tandem electrophotographic color printer or the like which includes an intermediate transfer belt as an image bearing member. One or more sensors are disposed on the intermediate transfer belt in the main scanning direction. These sensors are collectively called the detecting section 23.

Figure 2:
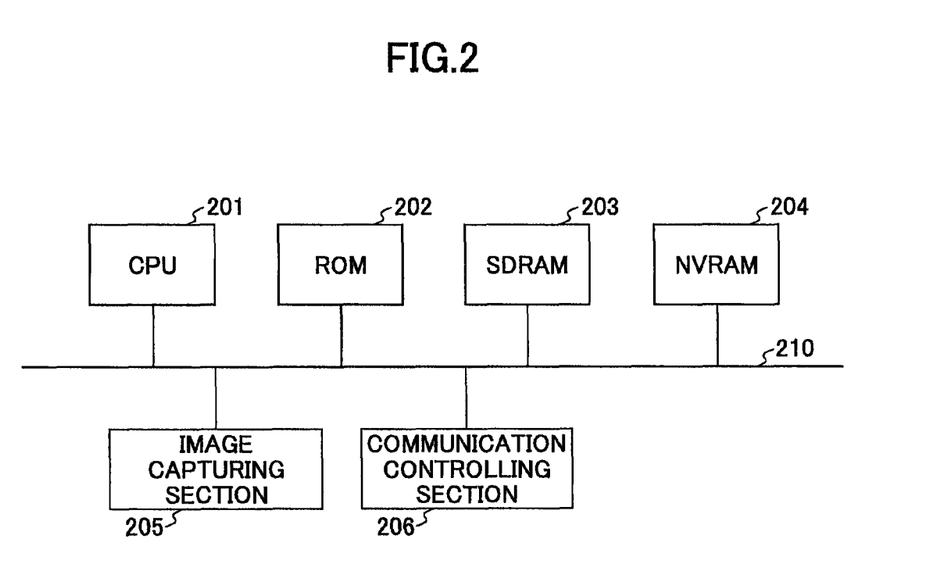
FIG. 2 is a hardware configuration diagram of an image processing section.

FIG. 2 is a hardware configuration diagram of the image processing section 10. A CPU 201 executes various tasks. A ROM 202 stores various programs to be executed by the CPU 201. An SDRAM 203 stores data being processed by the CPU 201, image data, and the like, temporarily. An NVRAM 204 is a non-volatile memory to store various parameters, tables, and the like. An image capturing section 205 is a scanner section. A communication controlling section 206 is connected with a personal computer or the like via a LAN or the like. The CPU 201, the ROM 202, the SDRAM 203, the NVRAM 204, the image capturing section 205, and the communication controlling section 206 are connected with each other via a bus 210.

The CPU 201 and programs stored in the ROM 202 implement functions of the sections 11 to 14, and 16 in FIG. 1. The detected value holding section 15 is implemented by the SDRAM 203, and the corrected value holding section 17 is implemented by the NVRAM 204.

The image forming section 20 has basically the same configuration as the image processing section 10, which is not shown. The image processing section 10 and the image forming section 20 may be configured in one unit if the configuration in FIG. 2 is connected with the image creating section 22, the detecting section 23, the operation panel 30, and the like via the bus 210.

Referring to FIG. 1, when executing a normal printing operation, an image data input from a PC, an image scanning section, or the like is processed with prescribed tasks at the color converting section 11, the black color generating section 12, the density converting section 13, and the tone converting section 14 of the image processing section 10. First, color conversion (for example, RGB to CMY) is executed at the color converting section 11, then, black color is generated at the black color generating section 12. Next, at the density converting section 13, density conversion is executed based on a density correction table in the corrected value holding section 17, which holds a density correction characteristic (a density correction curve). The corrected value holding section 17 holds a density correction table for each of tone characteristics. The corrected value holding section 17 also holds a target value for correction and a correction coefficient, which will be described later. The image data having density conversion applied then has tone conversion applied at the tone converting section 14.

The image data (CMYK) after having the tone conversion applied is sent to the image creating section 22 of the image forming section 20. At the image creating section 22, based on the image data sent from the image forming section 20, a full-color image is created by superposing toner images of black, cyan, magenta, and yellow, which is printed on a recording sheet to be ejected.

On the other hand, when executing a correction process of the density correction table, in response to a user request from the operation panel 30 or a specific condition satisfied in the image processing section 10, a detecting pattern is generated by the detecting pattern generating section 21 of the image forming section 20, which is created on an image bearing member such as the intermediate transfer belt of the image creating section 22. The density of the detecting pattern created on the image bearing member or the like is captured by the detecting section 23. Here, capturing of density is taken as an example. Alternatively, a characteristic to be captured may be brightness. After capturing the detecting pattern, at the detected value converting section 24, the captured detecting pattern is converted to a detected value that can be processed at the image processing section 10, then sent to the image processing section 10.

At the image processing section 10, the detected value sent from the image forming section 20 is held temporarily in the detected value holding section 15. At the correcting section 16, a corrected value (a point on a correction curve) is calculated using the detected value held in the detected value holding section 15 and a target value for correction and a correction coefficient held in the corrected value holding section 17 to correct the density correction table for each tone characteristic in the corrected value holding section 17. As will be described later, as a target value, a fixed value or a previously detected value is used. Having been corrected, the density correction table is held in the corrected value holding section 17 to be used for a density correction for image data which is to be processed later at the density converting section 13. Also, the detected value used to calculate the corrected value is held in the corrected value holding section 17 to be used for a correction later.

Next, the correction process for the density correction table (density correction characteristic) will be described in detail.

Figure 3:
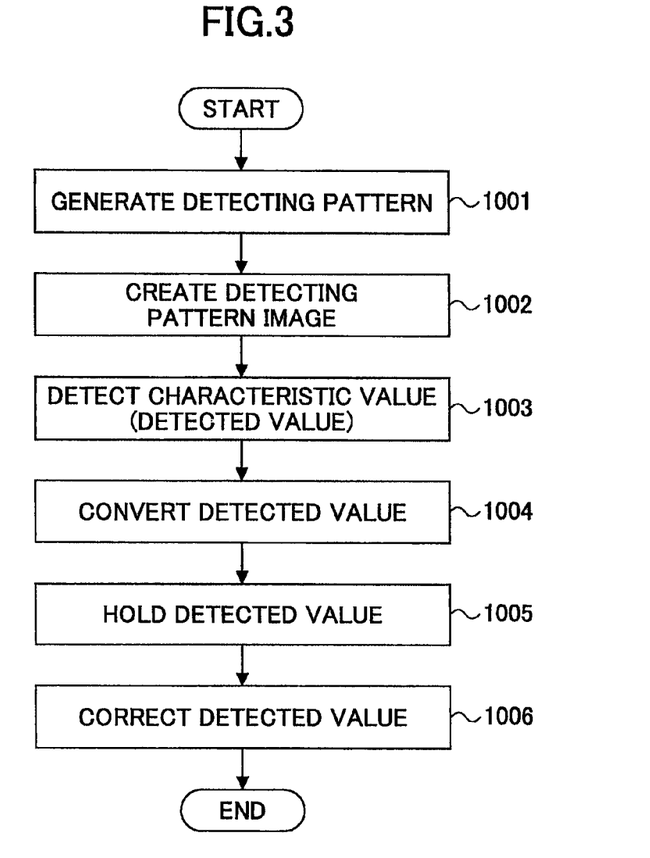
FIG. 3 is an overall flowchart of a density correction process.

FIG. 3 is an overall flowchart of the density correction process. The process may be started with a manual request from the operation panel 30 or an automatic start triggered by a prescribed condition satisfied in the image forming apparatus 100. Prescribed conditions for automatic start include a timing soon after the main power source of the image forming apparatus 100 has been put on, a timing soon after the image forming apparatus 100 has recovered from an energy-saving state, a timing soon after the image forming apparatus 100 has finished a printing task, a timing soon after a part or a unit of the image forming apparatus 100 has been exchanged, or the like. Other conditions that may be included are a prescribed number of sheets that have been printed, or a time that has passed since the main power source has been put on.

After the start of the process, the detecting patterns are generated at the detecting pattern generating section 21 of the image forming section 20 (Step 1001). Specifically, multiple detecting patterns are generated for multiple prescribed area ratios (tone values), for each of colors of black, cyan, magenta, and yellow. Data for the detecting pattern (the sample image data) is stored in the NVRAM 204 (see FIG. 2) or the like in advance.

The detecting patterns generated at the detecting pattern generating section 21 are created as images on the image bearing member such as the intermediate transfer belt in the secondary scanning direction starting from, for example, a pattern with the lowest area ratio to a pattern with the highest area ratio (Step 1002). Here, when creating the images of the detecting patterns, the images are created with separate colors, namely, a single pattern is created with only one of a black toner, a cyan toner, a magenta toner, or a yellow toner, which is different from a normal printing where multiple toner images are superposed to form an image.

Figure 5:
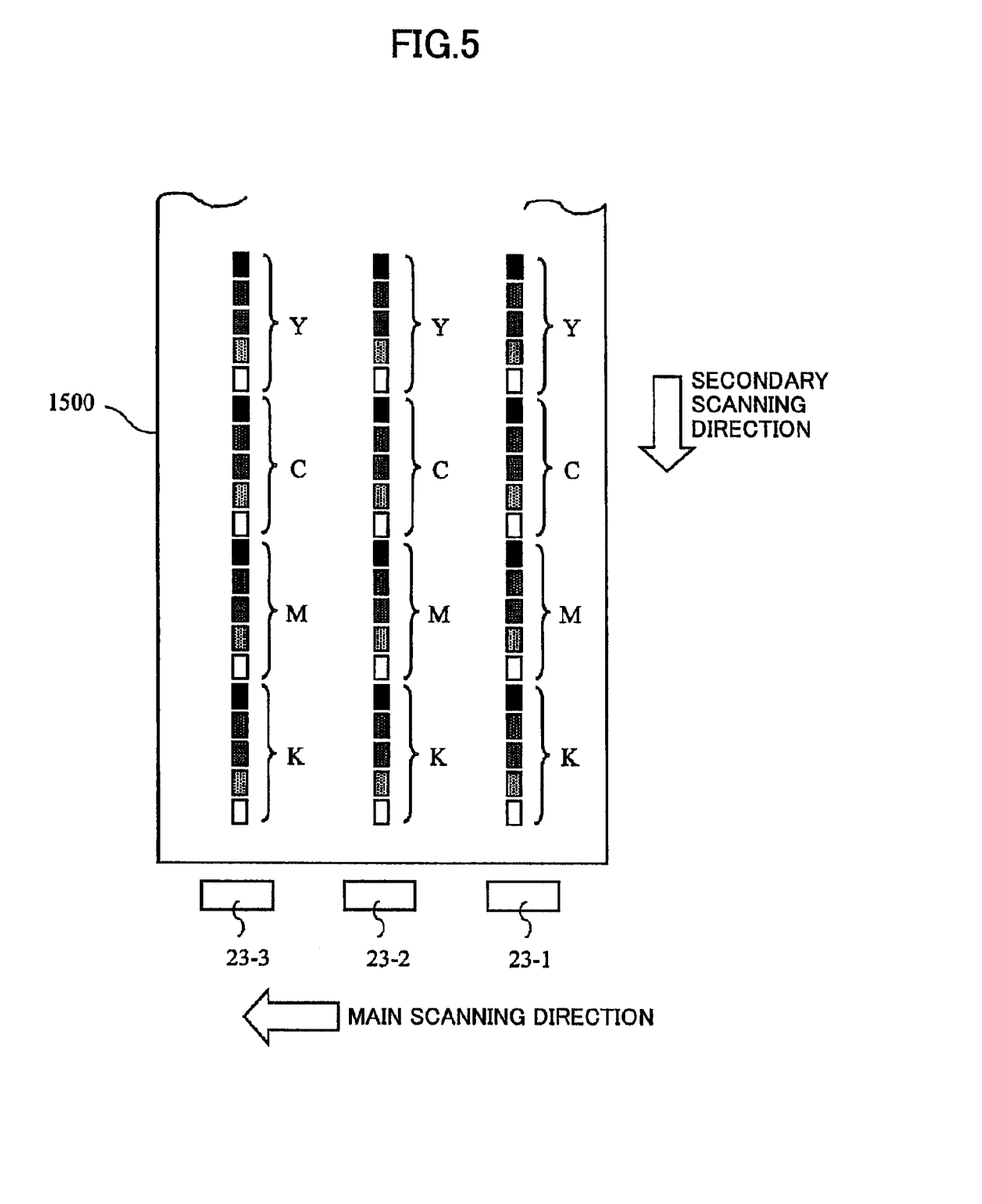
FIG. 5 is a schematic view illustrating how a detecting pattern is created on an image bearing member.

Although the size and arrangement of the detecting pattern depend on the number of capturing sensors on the detecting section 23 and characteristics of the sensor, here, it is assumed that multiple capturing sensors are arranged in the main scanning direction of the image bearing member such as the intermediate transfer belt. FIG. 5 shows how the detecting patterns are created on the intermediate transfer belt 1500 to be captured with three capturing sensors 23-1, 23-2, and 23-3 of the detecting section 23.

After the detecting patterns have been created on the image bearing member, a characteristic value of the detecting pattern is detected by the capturing sensor of the detecting section 23 (Step 1003). A characteristic may be density, amount of toner transferred, or brightness such as La*b*.

After the characteristic value is detected, at the detected value converting section 24, the characteristic value is converted into a value which can be processed at the image processing section 10 (Step 1004). Specifically, if multiple pattern images (in FIG. 5 there are three) are created with the same color toner and the same area ratio (the same tone value), the captured results are averaged or normalized.

The processed result at the detected value converting section 24 is sent to the image processing section 10 as the detected value. The detected values include multiple values corresponding to multiple area ratios for each of the colors black, cyan, magenta, and yellow.

The detected value sent from the image forming section 20 is held in the detected value holding section 15 temporarily (Step 1005). After that, at the correcting section 16, a corrected value is calculated using the detected value held in the detected value holding section 15 and a target value for correction and a correction coefficient held in the corrected value holding section 17 in advance (Step 1006).

Figure 4:
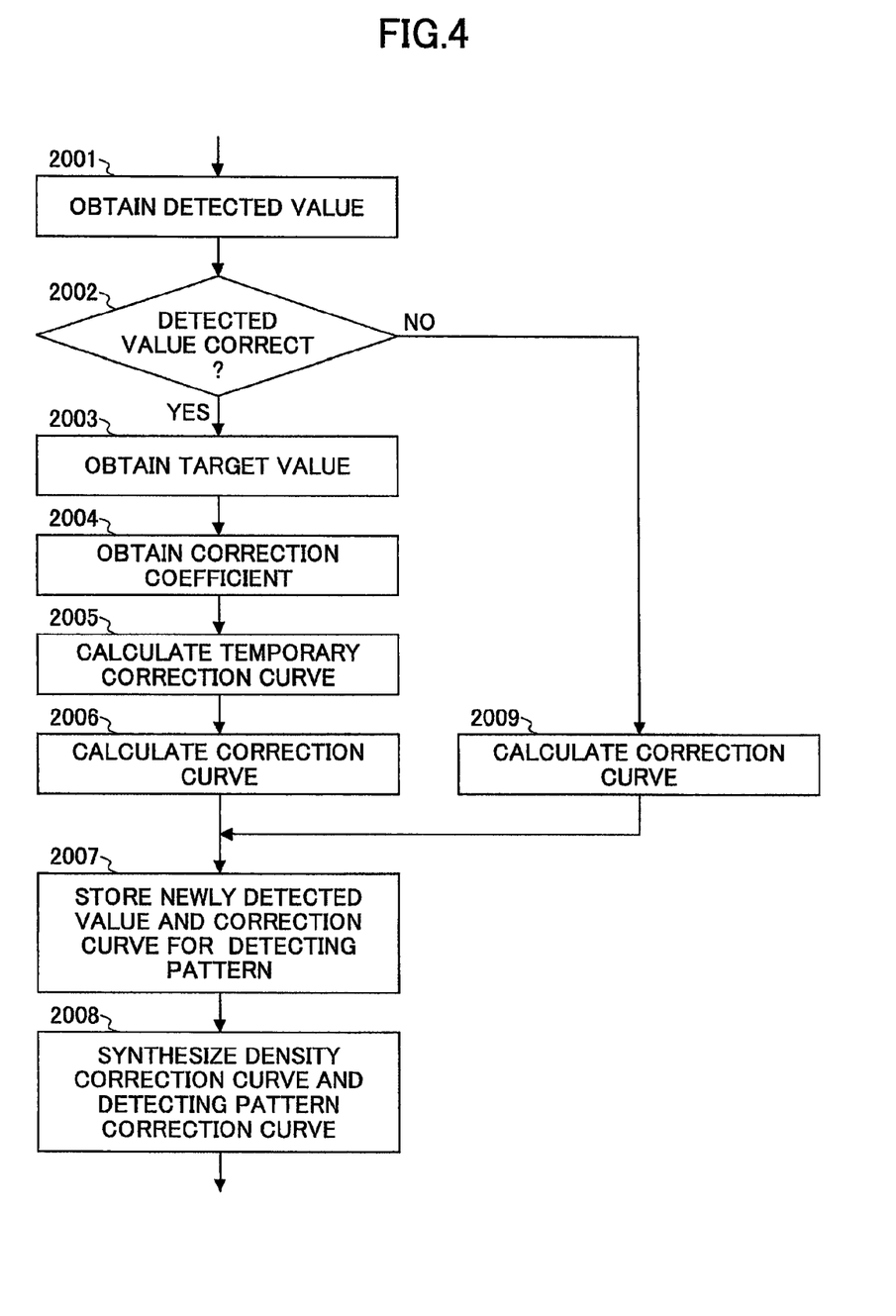
FIG. 4 is a detailed flowchart of the density correction process.

FIG. 4 is a detailed flowchart of the density correction process. The procedure shown in FIG. 4 is repeated for each of the colors black, cyan, magenta, and yellow. In the following, the color is not specified for the sake of simplicity of explanation.

At the correcting section 16, the detected values are obtained from the detected value holding section 15 (Step 2001). There are multiple detected values corresponding to multiple area ratios (tone values) for each color.

After the detected values have been obtained, it is determined whether the detected values are valid (Step 2002). The validity of the detected values is determined by:
(1) checking a range of the captured values,
(2) checking whether a captured value is reversed,
(3) checking the most dense tone value in a range, and the like.

If the detected values are determined to be valid (YES in Step 2002), target values required for the correction process are obtained from the corrected value holding section 17 (Step 2003). The target values to be obtained are either of fixed values set beforehand as reference values when designing the image forming apparatus 100, or the detected values (previous values) obtained with a previous execution of the correction process.

Which of the fixed values or the previous values are used is determined in two ways. First, at the previous step (Step 2002) of determining the validity of the detected values, if the most dense tone value (the detected value corresponding to the pattern with the highest area ratio) is within a range of threshold values, the fixed values are used; otherwise the previous values are used. By determining the validity with threshold values to change the target values, excessive correction can be avoided. Second, among the specific conditions satisfied in the image forming apparatus 100 to start the correction process, a timing condition can be used. If the image forming apparatus 100 is executing a printing operation or has just finished a printing operation, the fixed values are used; otherwise, the previous values are used. By changing the target values in response to an operating state of the image forming apparatus 100, excessive correction can be avoided.

After the target values have been obtained, correction coefficients are obtained from the corrected value holding section 17 (Step 2004). Correction coefficients may be the same value for each color and each tone value, or can be changed with tone values of low-density, middle density, and high density. Also, correction coefficients may be changed with a type of an image, for example a picture image in which middle density may be dominant, or a document image in which high density may be dominant. Also, correction coefficients may be changed depending on an environment where the image forming apparatus 100 is installed. Temperature and humidity may be detected by the image forming apparatus 100. In a high-temperature, high-humidity environment where color materials tend to be unstable, correction coefficients may be set to small values to avoid excessive correction. Practically, it is preferable to set the value of a correction coefficient below 1.0, because values captured by the sensor tend to have variations caused by factors such as precision of the capturing sensors, and the uniformity of a plane of an image bearing member.

After the correction coefficients have been obtained, the correction procedure proceeds to the next steps. First, a temporary correction characteristic (a temporary correction curve) is calculated for the detecting patterns before being multiplied with the correction coefficients for the detected values (Step 2005). Next, by multiplying the correction coefficients by the temporary correction characteristic, a correction characteristic (a correction curve) for the detecting patterns is calculated (Step 2006). Then, the newly obtained detected values and the calculated correction characteristic (the correction curve) for the detecting patterns are held in the corrected value holding section 17 (Step 2007). At this moment, old detected values (the previous values) that have been held in the corrected value holding section 17 are deleted. Next, the density correction characteristic (the density correction curve) for each tone held in the corrected value holding section 17 and the density correction characteristic (the correction curve) for the detecting patterns are synthesized (Step 2008). Then, the synthesized density correction characteristic (the correction curve) is newly held in the corrected value holding section 17. Here, the density correction characteristic is held as a density correction table.

On the other hand, if the detected values are determined to be not valid at the Step 2002 (NO in Step 2002), a straight line $y=x$ is used as the correction curve for the detecting patterns (Step 2009).

Figure 6:
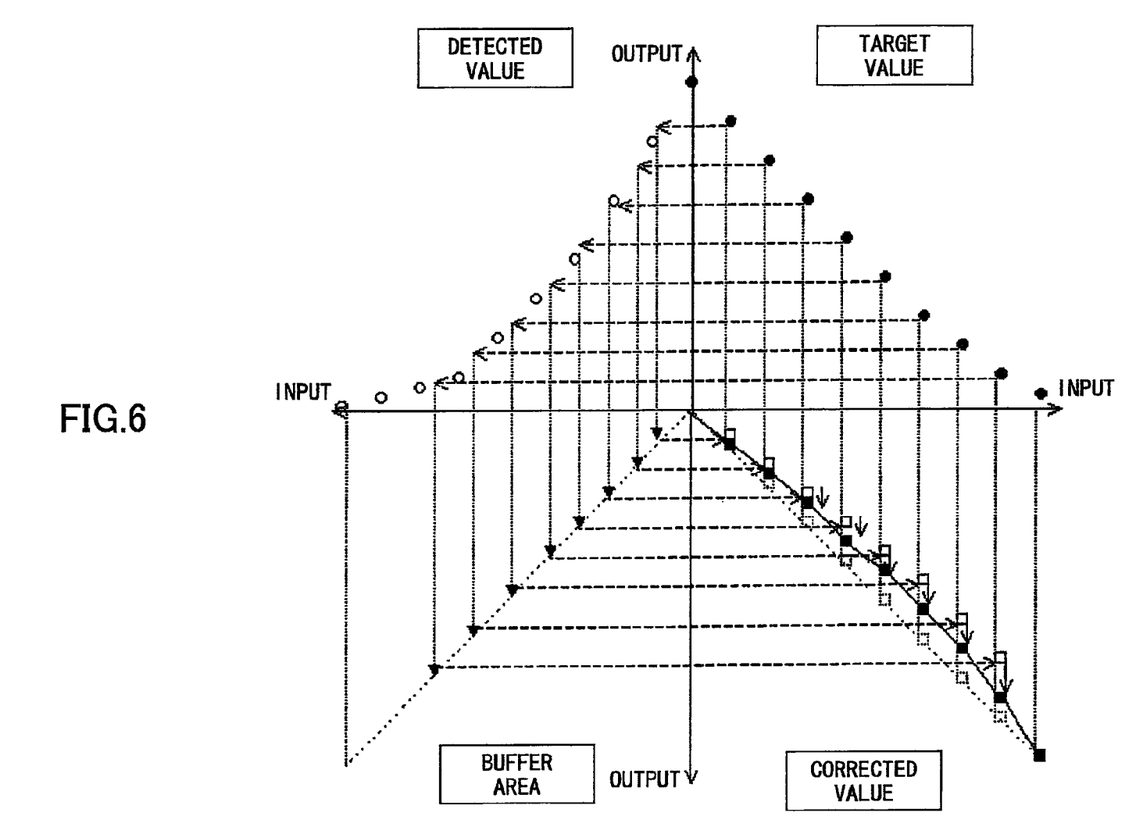
FIG. 6 is a schematic view illustrating generation of a correction curve for detecting patterns.
Figure 7:
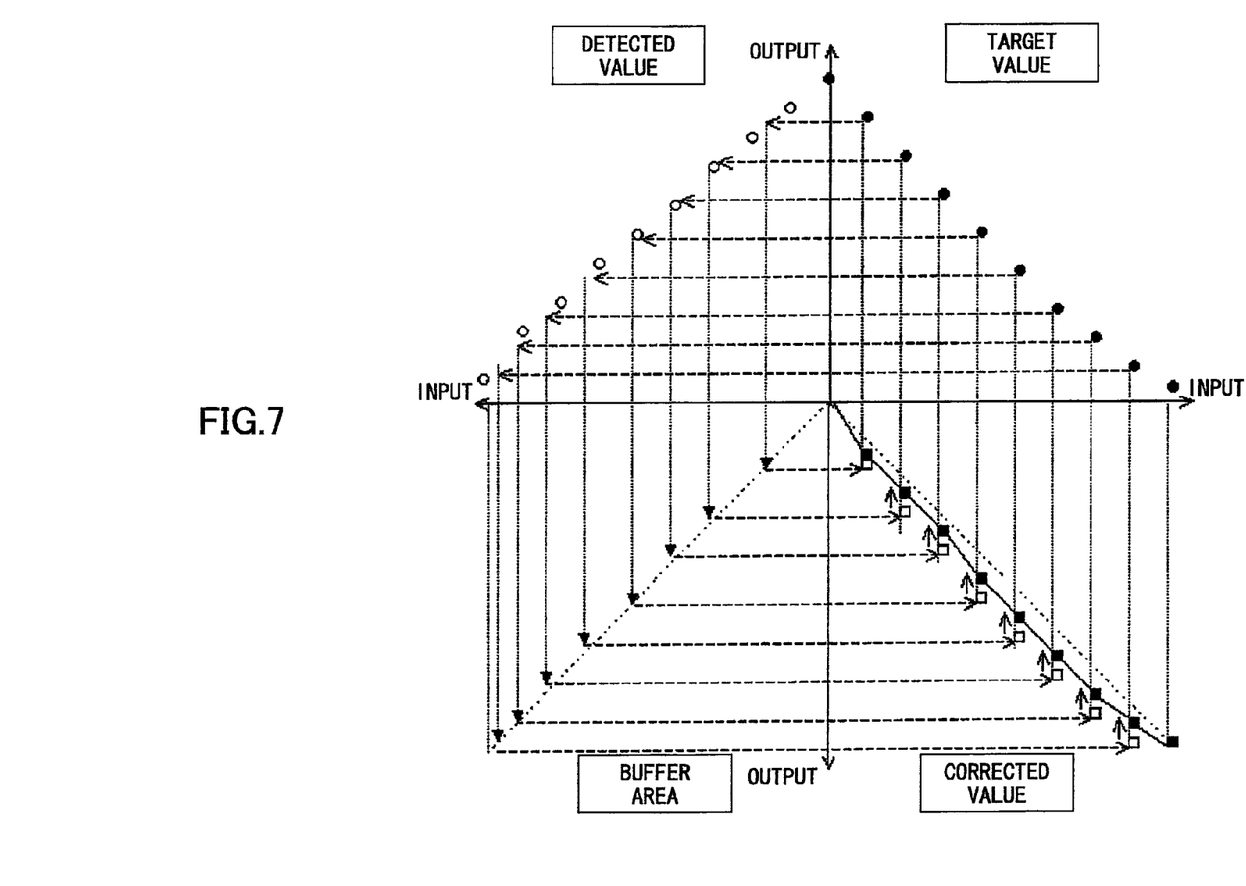
FIG. 7 is another schematic view illustrating generation of a correction curve for detecting patterns.

FIGS. 6 and 7 are schematic views illustrating generation of correction curves. In FIGS. 6 and 7, selected target values are plotted in the first quadrant, and the newly detected values are plotted in the second quadrant. A straight line X is drawn in the third quadrant which is used as a buffer area in the present embodiment. Alternatively, the third quadrant may be used for a conversion with a curve corresponding to a characteristic of a recording medium. In the fourth quadrant, the corrected values are plotted, which shows a mapping between the input values corresponding to the target values, and the output values multiplied with correction coefficients. In FIGS. 6 and 7, it is assumed that a characteristic (detected values) has a tendency to take a smaller value while the input tone value becomes greater (the amount of toner transferred is greater), such as brightness.

After the target values have been plotted, obtained detected values are plotted, to calculate input values of the detected values corresponding to the output values of the target values using the first and second quadrants. When calculating the input values in the second quadrant from the output values in the first quadrant using the detected values, a linear interpolation or a spline interpolation is used. Next, cross points of the input values in the fourth quadrant (corresponding to the input values in the first quadrant) and the output values of the third quadrant (corresponding to the input values in the second quadrant because a conversion is not applied in the third quadrant here) are obtained. This operation corresponds to the calculation of a temporary correction curve for the detecting patterns (temporary correction values). FIG. 6 shows a case in which detected values are darker than input values in general, whereas FIG. 7 shows a case in which detected value are brighter than input values in general. Small white boxes in FIGS. 6 and 7 are the temporary corrected values, which form a temporary corrected curve when connected. By multiplying the temporary corrected values by a correction coefficient, the corrected values are calculated, which are shown as small black boxes in FIGS. 6 and 7. The corrected curve for the detecting pattern is obtained by connecting these small black boxes. Here, it is preferable to limit a correction curve for detecting patterns within a range of a curve without correction as well as within a range of a temporary corrected curve before the correction coefficient is applied. With this limitation, excessive correction can be avoided further.

Here, in FIGS. 6 and 7, a straight line corresponding to $y=-x$ in the fourth quadrant is a correction curve used if the detected values are determined as not valid.

Figure 8A:
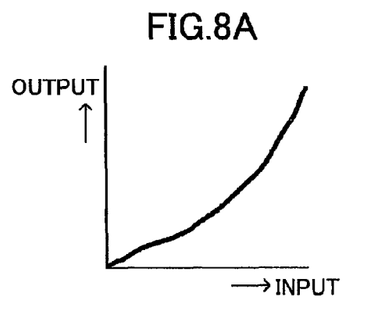
FIGS. 8A-8E are schematic views illustrating synthesis of a density correction curve provided for each tone characteristic and a correction curve for detecting patterns.
Figure 8B:
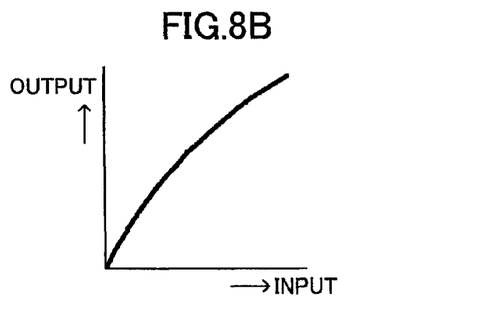
Figure 8C:
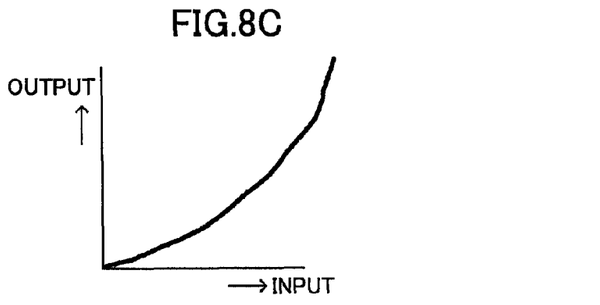
Figure 8D:
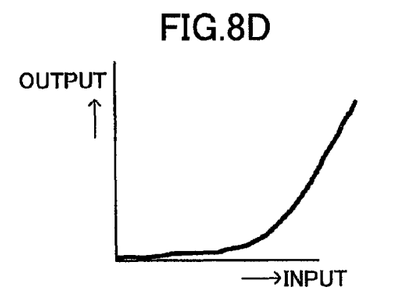
Figure 8E:
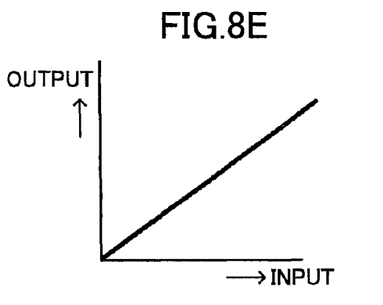

The correction curve for the detecting patterns calculated as above, is synthesized with the density correction curve for each tone characteristic to generate a new density correction curve (a density correction table) for each tone characteristic. FIGS. 8A-8E illustrate how syntheses are carried out. FIGS. 8A and 8B are existing density correction curves for specific tone characteristics, and FIG. 8C is a calculated correction curve for detecting patterns. By synthesizing the curve in FIG. 8A and the curve in FIG. 8C, a density correction curve is generated as shown in FIG. 8D. Also, by synthesizing the curve in FIG. 8B and the curve in FIG. 8C, a density correction curve is generated as shown in FIG. 8E. Namely, if the existing density correction curve is represented as $y=f(x)$ and the calculated correction curve for detecting patterns is represented as $y=g(x)$, then the new density correction curve is represented as $y=f(x)+g(x)-x$.

As above, the embodiments of the present invention have been described. Further, the present invention is not limited to these embodiments, but various variations and modifications may be made without departing from the scope of the present invention. For example, there may be only one capturing sensor at the detecting section 23. In this case, detected values do not need to be averaged at the detected value converting section 24. Also, as mentioned earlier, a characteristic detected by the capturing sensors is not limited to density, but may be brightness.

The present application is based on Japanese Priority Application No. 2012-057726 filed on Mar. 14, 2012, with the Japanese Patent Office, the entire contents of which are hereby incorporated by reference.

What is claimed is:

1. An image forming apparatus including density correction characteristic data for a tone characteristic and a section to execute density conversion on input image data based on the density correction characteristic data, comprising:
a section to generate multiple detecting patterns with multiple area ratios;
a section to create images of the multiple detecting patterns in a prescribed order on an image bearing member;
a section to detect the images of the multiple detecting patterns created on the image bearing member;
a section to hold multiple detected values corresponding to the images of the multiple detecting patterns detected from the image bearing member;
a section to obtain either of fixed values or previously detected values as target values for correction based on a prescribed condition, and also to obtain correction coefficients to be used for adjustment;
a section to calculate a temporary correction characteristic corresponding to the detecting patterns from the obtained target values and the detected values;
a section to calculate a correction characteristic corresponding to the detecting patterns from the temporary correction characteristic and the obtained correction coefficient; and
a section to synthesize new density correction characteristic data for each of plural of the tone characteristics from the density correction characteristic data for the corresponding tone characteristic and the correction characteristic corresponding to the detecting patterns.

2. The image forming apparatus as claimed in claim 1 further comprising:
a section to the determine whether the detected values are valid; and
a section to set a prescribed straight-line as the correction characteristic corresponding to the detecting patterns.

3. The image forming apparatus as claimed in claim 1, wherein the prescribed condition to obtain either of the fixed values or the previously detected values as the target values is whether the detected values of the detecting patterns with a high area ratio is within a range of prescribed threshold values.

4. The image forming apparatus as claimed in claim 1, wherein the prescribed condition to obtain either of the fixed values or the previously detected values as the target values is whether a correction is executed during a printing operation or soon after the printing operation.

5. The image forming apparatus as claimed in claim 1, wherein the correction coefficient takes a single value for all of colors and all of tone values, or takes multiple values for the colors and the tone values.

6. The image forming apparatus as claimed in claim 1, wherein the correction characteristic is limited within a range of a curve characteristic without correction as well as within a range of the temporary correction characteristic before having the correction coefficient applied.

7. A density correction method for an image forming apparatus including density correction characteristic data for a tone characteristic and a section to execute density conversion on input image data based on the density correction characteristic data, the method comprising the steps of:
generating multiple detecting patterns with multiple area ratios;
creating images of the multiple detecting patterns in a prescribed order on an image bearing member;
detecting the images of the multiple detecting patterns created on the image bearing member;
holding multiple detected values corresponding to the images of the multiple detecting patterns detected from the image bearing member;
obtaining either of fixed values or previously detected values as target values for correction based on a prescribed condition, and also obtaining correction coefficients to be used for adjustment;
calculating a temporary correction characteristic corresponding to the detecting patterns from the obtained target values and the detected values;
calculating a correction characteristic corresponding to the detecting patterns from the temporary correction characteristic and the obtained correction coefficient; and
synthesizing new density correction characteristic data for each of the plural of the tone characteristics from the density correction characteristic data for the corresponding tone characteristic and the correction characteristic corresponding to the detecting patterns.

* * * * *